United States Patent
Tsui et al.

(10) Patent No.: US 7,472,306 B2
(45) Date of Patent: Dec. 30, 2008

(54) PROCESSOR TIMING APPARATUS, SYSTEMS, AND METHODS

(75) Inventors: Ernest Tsui, Cupertino, CA (US); Inching Chen, Portland, OR (US)

(73) Assignee: Intel Corporation, Santa Clara, CA (US)

(*) Notice: Subject to any disclaimer, the term of this patent is extended or adjusted under 35 U.S.C. 154(b) by 464 days.

(21) Appl. No.: 10/848,479

(22) Filed: May 18, 2004

(65) Prior Publication Data

US 2005/0262370 A1    Nov. 24, 2005

(51) Int. Cl.
G06F 1/10 (2006.01)
G06F 1/12 (2006.01)
G06F 1/32 (2006.01)

(52) U.S. Cl. ............... 713/600; 713/300; 713/375; 713/400; 713/401; 713/500

(58) Field of Classification Search ............... 713/300, 713/375, 400, 401, 500, 600
See application file for complete search history.

(56) References Cited

U.S. PATENT DOCUMENTS

| | | | | |
|---|---|---|---|---|
| 5,594,866 A | * | 1/1997 | Nugent | 709/234 |
| 6,233,702 B1 | * | 5/2001 | Horst et al. | 714/48 |
| 2002/0007463 A1 | | 1/2002 | Fung | |
| 2002/0095610 A1 | * | 7/2002 | Nunomura | 713/322 |
| 2003/0065960 A1 | | 4/2003 | Rusu et al. | |
| 2003/0188052 A1 | * | 10/2003 | Hamilton | 710/22 |
| 2003/0196126 A1 | * | 10/2003 | Fung | 713/300 |
| 2004/0106436 A1 | * | 6/2004 | Ochi et al. | 455/562.1 |
| 2004/0163000 A1 | * | 8/2004 | Kuhlmann et al. | 713/300 |
| 2005/0019033 A1 | * | 1/2005 | Oh et al. | 398/58 |
| 2005/0107050 A1 | * | 5/2005 | Nawata | 455/115.1 |

FOREIGN PATENT DOCUMENTS

| | | | |
|---|---|---|---|
| EP | 0978781 | * | 2/2000 |
| EP | 0978781 A2 | | 2/2000 |
| WO | WO-2005/116799 A2 | | 12/2005 |

OTHER PUBLICATIONS

TCP, http://www.rhyshaden.com/tcp.htm.*
"International Search Report for corresponding PCT Application No. PCT/US2005/014881", (Dec. 23, 2005),3 pgs.

* cited by examiner

Primary Examiner—Thuan N. Du
Assistant Examiner—Fahmida Rahman
(74) Attorney, Agent, or Firm—Schwegman, Lundberg & Woessner, P.A.

(57) ABSTRACT

An apparatus and a system, as well as a method and article, may operate to independently adjust a plurality of processor clocks coupled to a corresponding plurality of networked processors responsive to one or more status indicators to provide scalable performance and power consumption. The status indicators may indicate the status of routers coupled to the processors. Additional apparatus, systems, and methods are disclosed.

23 Claims, 3 Drawing Sheets

PROCESSOR TIMING APPARATUS, SYSTEMS, AND METHODS

TECHNICAL FIELD

Various embodiments described herein relate to information processing generally, such as apparatus, systems, and methods used to process data, including individual data elements and data packets.

BACKGROUND INFORMATION

Arrays of processing elements can bring a great deal of processing power to bear on commonly-identified tasks. However, synchronous operation of the individual elements may give rise to undesirable results, including wasted power and inefficient use of available resources.

DETAILED DESCRIPTION

Figure 1:
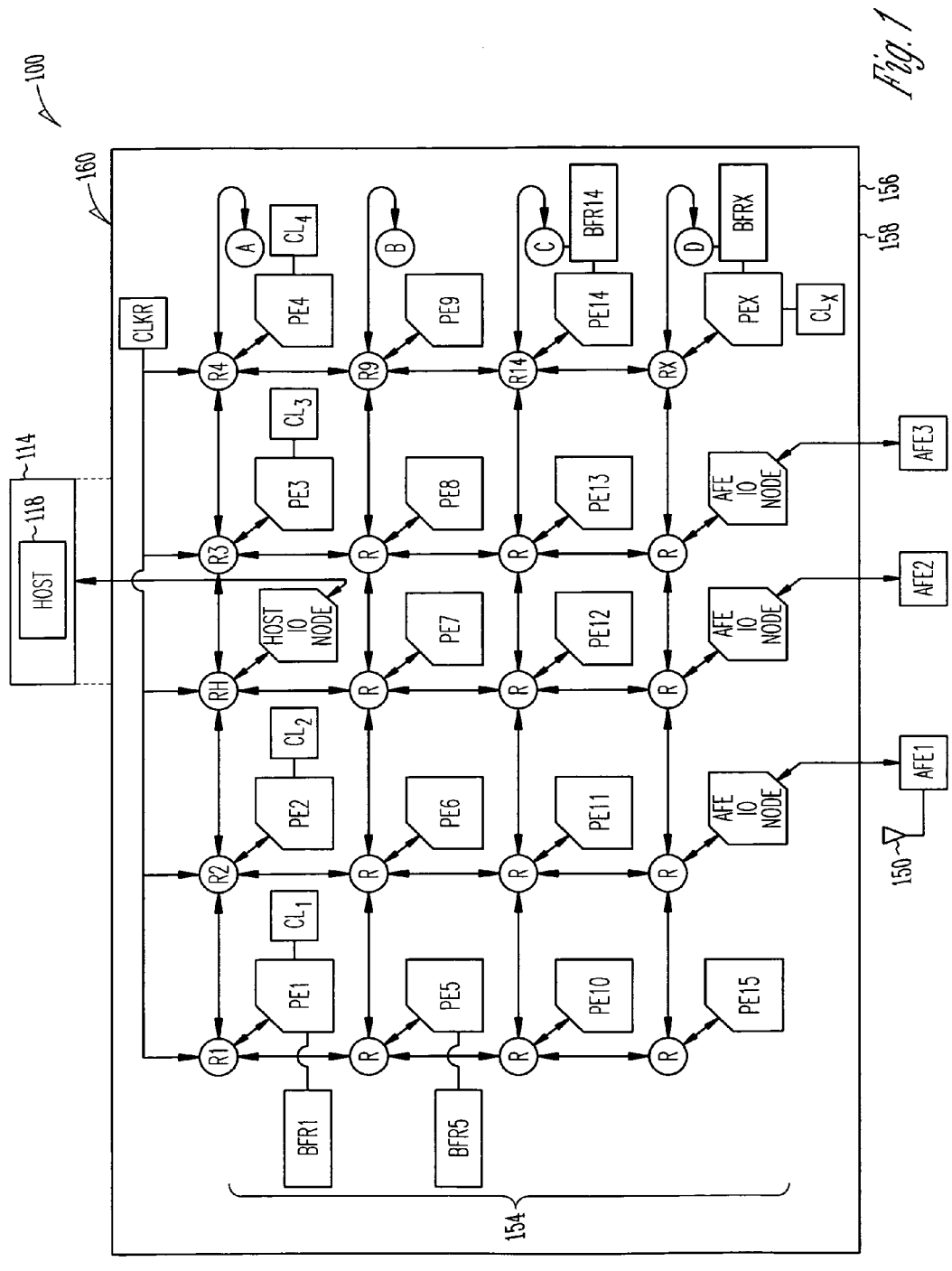
FIG. 1 is a block diagram of an apparatus and a system according to various embodiments.

In some embodiments, a plurality of processing elements may operate to process information by adjusting clock signal frequencies applied to corresponding individual elements on an as-needed basis (such that individual elements can be clocked asynchronously). In some cases, this may mean that elements operating with less than a full-load are selected to operate at a lower frequency than other elements. In some cases, elements unable to process their assigned workload may have their applied clock frequency increased. In some embodiments, routers used to connect individual processing elements may operate in a synchronous fashion. Such an approach to processing information may result in reduced power usage, and a more equitable allocation of available processing resources.

For the purposes of this document, the term "energy conduit" may include any type of device or apparatus that has the capability to transmit and/or receive energy to and/or from space. Examples of such energy conduits include antennas (e.g., omnidirectional, beam, directional, patch, monopole, dipole, etc.), infra-red transmitters, infra-red receivers, infra-red transceivers, photo-emitters (e.g., light emitting diodes), photo-receptors (e.g., photocells), and charge-coupled devices, among others.

"Networked processors" may refer to any group of two or more processing elements that are interconnected so as to be capable of sharing information provided by a common source, and/or so as to be able to transmit information to a common destination, where the common source or destination may be a memory, a network, a router, a switch, etc. In some embodiments, networked processors may be co-located on a die and/or a motherboard. In some embodiments, networked processors may form part of a global information network.

A "status indicator" may mean any mechanism (e.g., a circuit, an object, a software or hardware flag, a register, an interrupt, etc.) that provides an indication or information about a level of processing resource usage, including, but not limited to: a buffer/storage fill level, a forecast of buffer/storage fill velocity, a prior buffer/storage fill acceleration rate, a level of congestion in a network or at a port, an operating frequency, a data transport speed, a data acquisition speed, a forecast change in data acquisition speed, a number of write operations over time, a prior number of read operations over time, etc. For example, a first amount of buffer fill (e.g., 50%) may be compared against a second amount of buffer fill (e.g., 75%) to determine that the second buffer is more fully utilized at a particular instant than the first buffer. Another example includes an alarm indicating that a processing element is forecast to use 110% of its allocated energy budget if a current resource allocation is maintained.

The term "transceiver" (e.g., a device including a transmitter and a receiver) may be used in place of either "transmitter" or "receiver" throughout this document. Similarly, the terms receiver and/or transmitter may be used in place of the term "transceiver" throughout this document.

FIG. 1 is a block diagram of an apparatus 100 and a system 110 according to various embodiments. For example, an apparatus 100 may comprise an adjustment module 114 to independently adjust a plurality of processor clocks CL1, CL2, ..., CLX coupled to a corresponding plurality of networked processors PE1, PE2, ..., PEX. The adjustment module 114 may operate to adjust one or more of the clocks CL1, CL2, ..., CLX (and CLKR) responsive to one or more status indicators A, B, C, D included in the apparatus 100. The apparatus 100 may include a host processor 118 in the adjustment module 114. The apparatus 100 may also include one or more analog components, such as analog front-end input-output nodes AFE IO NODE and analog front-ends AFE1, AFE2, AFE3, which may in turn include any number of component elements, such as a transceiver, for example.

In many embodiments, one or more buffers BFR1, BFR5, ..., BFRX may be coupled to the status indicators A, B, C, and D. The buffers BFR1, BFR5, ..., BFRX coupled directly to the plurality of networked processors PE1, PE2, ..., PEX, or indirectly. Any one or more of the plurality of networked processors PE1, PE2, ..., PEX may be associated with one or more buffers BFR1, BFR5, ..., BFRX in this manner. In some embodiments, any number of buffers, such as buffers BFR14 and BFRX, may be independently coupled to status indicators, such as status indicators C and D, respectively. As noted previously, status indicators A, B, C, and D may be used, without limitation, to indicate a buffer fill status, a buffer fill velocity, and a buffer fill acceleration, among other elements of apparatus 100 operation and/or resource usage.

In some embodiments, the apparatus 100 may include a plurality of routers R1, R2, ..., RX coupled directly (or indirectly) to a corresponding plurality of networked processors PE1, PE2, ..., PEX, either in a one-to-one correspondence, or a many-to-one correspondence (e.g., multiple routers coupled to a single processor, and/or multiple processors couple to a single router). In some embodiments, the routers R1, R2, ..., RX may include a plurality of synchronously-clocked routers R1, R2, R3, and R4, perhaps clocked by a single clocking source CLKR.

In some embodiments, the processing elements included in the plurality of networked processors PE1, PE2, ..., PEX may be heterogeneous, and may perform different functions. Thus, it may be desirable that one, two, or all of the processing elements included in the plurality of networked processors PE1, PE2, ..., PEX operate at different clock frequencies, perhaps tailored to the required work load for each processing element included in the plurality of networked processors PE1, PE2, ..., PEX. As noted previously, in some embodiments, the networked processors PE1, PE2, ..., PEX may be co-located on a die 156 and/or a motherboard 158. In some embodiments, the networked processors PE1, PE2, ..., PEX may form part of a global information network 160.

In some embodiments, asynchronous clock frequencies may be provided by the clocks CL1, CL2, ..., CLX. Work load balancing between the processing elements included in the plurality of networked processors PE1, PE2, ..., PEX may be enabled by packetizing data for transport between the processing elements included in the plurality of networked processors PE1, PE2, ..., PEX. The buffers BFR1, BFR5, ..., BFRX may operate as interfaces between the processing elements included in the plurality of networked processors PE1, PE2, ..., PEX and the routers R1, R2, ..., RX so that asynchronicity between the transport network (e.g., the routers R1, R2, ..., RX and connections to the plurality of networked processors PE1, PE2, ..., PEX) that runs at one clock frequency, and the various processor element clock frequency rates (which may be the same or different from the transport network clocking frequency, provided in some embodiments by clock CLKR), can be accommodated. In some embodiments, the clocking speed of the plurality of routers R1, R2, ..., RX, which may be a synchronous clocking speed, may also be independently adjusted. Communications may be carried out between asynchronously clocked processing elements included in the plurality of networked processors PE1, PE2, ..., PEX via one or more status indicators, such as buffer status indicators C and D, for example.

In some embodiments, clock frequencies for the clocks CL1, CL2, ..., CLX, and CLKR may be determined statically at substantially the time of compilation. However, dynamic clock management can also be performed, perhaps depending on buffer fill status indicators. For example, a processing element PE1 falling behind in its assigned task (due to dynamics of the processor network or some factor not anticipated at compile time) may have its clock frequency (e.g., provided by CL1) increased as needed until a potential buffer overflow situation at buffer BFR1 is alleviated.

Other embodiments may be realized. For example, a system 110 may include an apparatus 100, similar to or identical to the apparatus 100 previously described, as well as an energy conduit 150 coupled to one or more of the plurality of the analog front-ends AFE1, AFE2, AFE3 and/or the networked processors PE1, PE2, ..., PEX. As noted previously, the speed for at least some of the plurality of processor clocks CL1, CL2, ..., CLX, and CLKR may be statically determined at substantially the time of compilation for a program to be commonly executed by the corresponding plurality of networked processors PE1, PE2, ..., PEX. Thus, for example, a first processor PE1 and a second processor PE2 included in the plurality of networked processors PE1, PE2, ..., PEX may have different operational speeds, as determined by the clocks CL1 and CL2.

In some embodiments, one or more status indicators A, B, C, and D may independently indicate the status of one ore more routers R1, R2, ..., RX coupled to the corresponding plurality of networked processors PE1, PE2, ..., PEX. For example, the status indicators A and B may independently indicate the status of the routers R4 and R9, respectively. Of course, the status indicators A, B, C, and D may indicate many different elements associated with the operations and resource usage of the apparatus 100 and system 110, such as network traffic loading. Thus, for example, the status indicators A and B may indicate the network traffic loading at two different points associated with the network 154 coupled to the plurality of networked processors PE1, PE2, ..., PEX.

The apparatus 100, systems 110, adjustment module 114, host processor 118, energy conduit 150, network 154, die 156, motherboard 158, information network 160, analog front-end input-output nodes AFE I0 NODE, analog front-ends AFE1, AFE2, AFE3, buffers BFR1, BFR5, ..., BFR14, BFRX, clocks CL1, CL2, ..., CLX, CLKR, networked processors PE1, PE2, ..., PEX, routers R1, R2, ..., RX, and status indicators A, B, C, and D may all be characterized as "modules" herein. Such modules may include hardware circuitry, one or more processors and/or memory circuits, software program modules, including objects and collections of objects, firmware, and combinations thereof, as desired by the architect of the apparatus 100 and systems 110, and as appropriate for particular implementations of various embodiments of the invention.

It should also be understood that the apparatus and systems of various embodiments can be used in applications other than for multi-processor dice and motherboards, and other than for wireless systems, and thus, various embodiments are not to be so limited. The illustrations of apparatus 100 and systems 110 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

Figure 2:
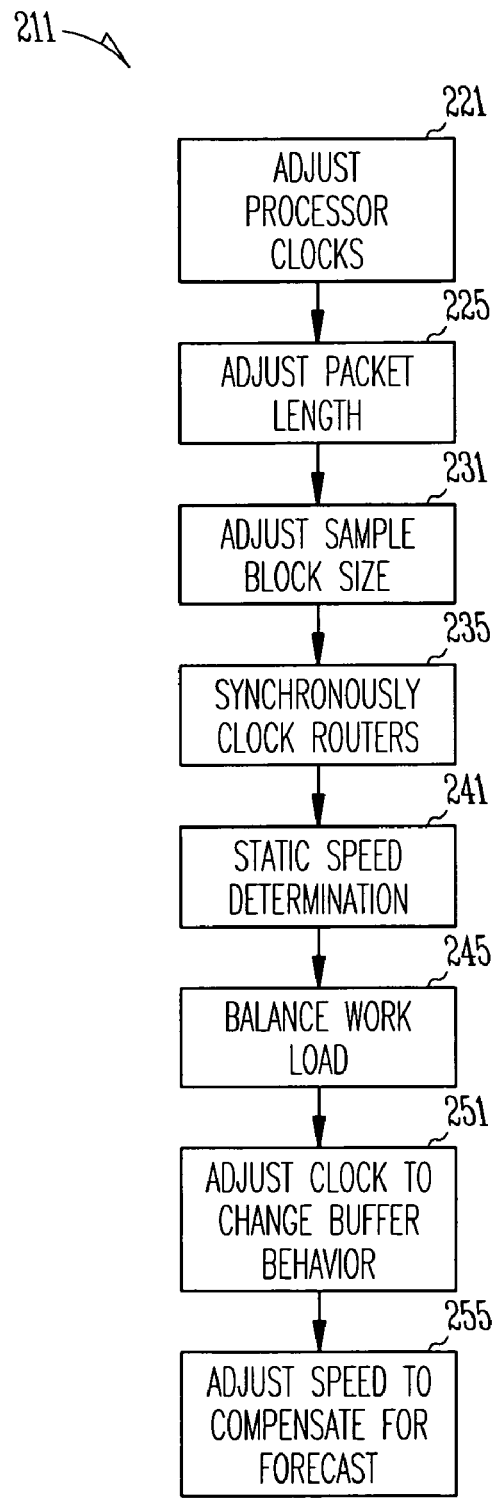
FIG. 2 is a flow chart illustrating several methods according to various embodiments.

FIG. 2 is a flow chart illustrating several methods according to various embodiments. Thus, in some embodiments of the invention, a method 211 may (optionally) begin with adjusting, perhaps independently, a plurality of processor clocks coupled to a corresponding plurality of networked processors responsive to one or more status indicators at block 221. For example, status indicators may be independently associated with a progress level of one or more processors included in the corresponding plurality of networked processors.

In some embodiments, the method 211 may include adjusting one or more packet lengths responsive to the progress level of one or more of the corresponding plurality of networked processors at block 225. In some embodiments, the method 211 may include adjusting one or more sample block sizes responsive to the progress level of one or more of the corresponding plurality of networked processors at block 231.

As noted previously, the status indicators may indicate the progress level of one or more processors according to the status of one or more buffers independently associated with one or more of the corresponding plurality of networked processors. For example, the status indicated may be selected from one or more of a buffer fill amount, a buffer fill rate, and a buffer fill acceleration, among others.

In some embodiments, the method 211 may include synchronously clocking a plurality of routers coupled to the corresponding plurality of networked processors at block 235. In some embodiments, the method 211 may include statically determining two or more different speeds for at least some of the plurality of processor clocks, perhaps at substantially the time of compilation for a program to be commonly executed by the corresponding plurality of networked processors at block 241.

In some embodiments, the method 211 may include independently adjusting the speed of one or more of the plurality of processor clocks to balance a processor workload measurement imbalance at block 245. The imbalance may be indicated by one or more of the status indicators, such as a first indicator and a second indicator (e.g., see FIG. 1, as status indicators C and D may be used to indicate workload progress and/or balance according to BFR14 status and BFRX status, such as the buffer fill status). Thus, any number of status indicators may be used to independently indicate the status of one or more buffers, the buffers in turn being independently associated with the progress and/or resource usage of one or more of the corresponding plurality of networked processors. For example, the status indicated may be selected from at least one of a sampling rate and a change in a sampling rate, among others.

In some embodiments, the method 211 may include independently adjusting the speed of one or more of the plurality of processor clocks at block 251 to change various performance elements, or indications of progress associated with the apparatus and systems disclosed herein, including buffer behavior, such as one or more of a buffer fill amount, a buffer fill rate, and a buffer fill acceleration, among others. In some embodiments, the method 211 may include independently adjusting the speed of one or more of the plurality of processor clocks at block 255 to compensate for one or more forecasted performance elements, or indications of progress associated with the apparatus and systems disclosed herein, including a forecasted workload and/or a forecasted network traffic loading, among others.

It should be noted that the methods described herein do not have to be executed in the order described, or in any particular order. Moreover, various activities described with respect to the methods identified herein can be executed in serial, parallel, or iterative fashion. For the purposes of this document, the terms "information" and "data" may be used interchangeably. Information, including parameters, commands, operands, and other data data, including data in various formats (e.g., time division, multiple access) and of various types (e.g., binary, alphanumeric, audio, video), can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment. Thus, other embodiments may be realized, as shown in FIG. 3.

Figure 3:
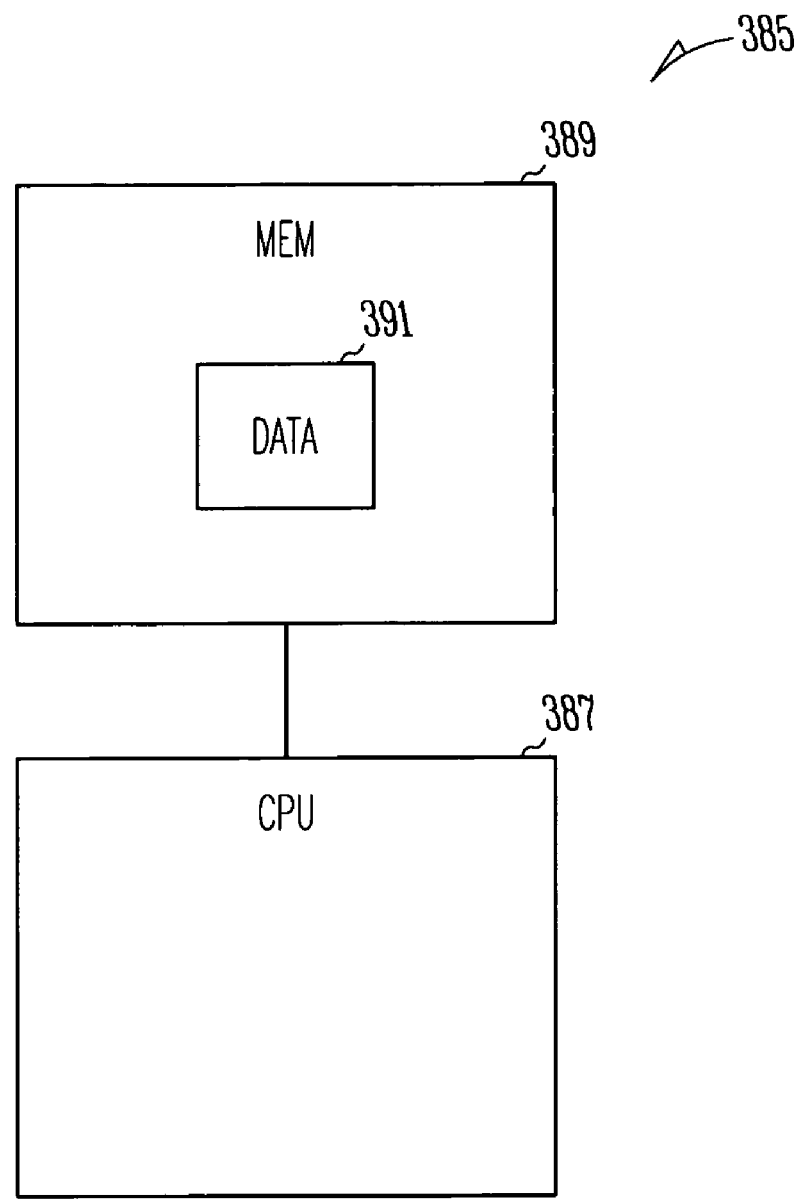
FIG. 3 is a block diagram of an article according to various embodiments.

FIG. 3 is a block diagram of an article 385 according to various embodiments, such as a computer, a memory system, a magnetic or optical disk, some other storage device, and/or any type of electronic device or system. The article 385 may comprise a processor 387 coupled to a machine-accessible medium such as a memory 389 (e.g., a memory including an electrical, optical, or electromagnetic conductor) having associated information 391 (e.g., computer program instructions, and/or other data), which when accessed, results in a machine (e.g., the processor 387) performing such actions as independently adjusting a plurality of processor clocks coupled to a corresponding plurality of networked processors responsive to at least one status indicator. As noted previously, status indicators may independently indicate the status of one or more buffers, which may in turn be independently associated with the progress of one or more of the corresponding plurality of networked processors. The indicated status may be selected from any number of elements, such as a sampling rate and a change in a sampling rate, among others.

Other activities may include independently adjusting the speed of one or more of the plurality of processor clocks to change at least one of a buffer fill amount, a buffer fill rate, and a buffer fill acceleration, among other possible indications of processor progress. Further activities may include independently adjusting the speed of one or more of the plurality of processor clocks to compensate for a forecasted workload and/or a forecasted network traffic loading, among other possible indications of processor progress.

Respecting the apparatus, systems, methods, and articles described herein, it should be noted that the clock speeds of the individual processors in the plurality of networked processors PE1, PE2, ..., PEX, as well as the clock speed of the transport network, may be adjusted to achieve an overall performance goal, perhaps established by one or more latency/response requirements and/or throughput requirements. In some embodiments the performance goal may be modified to operate below a specified power consumption limit. In some embodiments, the performance goal may be accomplished so as to achieve a lowest possible power consumption. As those skilled in the art may realize after reading this disclosure, one or more policies may be established to guide the behavior of the adjustment module 114 in adjusting clock speeds for the individual processors and the routers coupled via the transport network 154 (e.g., perhaps using one or more of the clocks CL1, CL2, ..., CLX, and CLKR) responsive to one or more status indicators A, B, C, D so as to achieve the performance goal.

Implementing the apparatus, systems, and methods described herein may result in asynchronous information processing within a networked group of processing elements. Some, one, or no processor clocks may be distributed, and in some embodiments, each processing unit may be operated with an independently adjustable clock, if desired. Clock settings for one, some, or all processing elements may be responsively adjusted in accordance with various status indications, permitting dynamic buffer management in some embodiments, perhaps based on instantaneous work load and buffer status. Such operations may yield information processing systems with scalable performance and power requirements.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, including:
   independently adjusting a plurality of processor clocks coupled to a corresponding plurality of networked processors responsive to at least one status indicator, wherein at least two status indicators, including the at least one status indicator, independently indicate a status of at least two routers coupled to the corresponding plurality of networked processors; and
   independently adjusting a speed of at least one of the plurality of processor clocks to balance a processor workload measurement imbalance indicated by the at least one status indicator and a second status indicator, wherein the second status indicator is different than the at least two status indicators.

2. The method of claim 1, wherein a third status indicator included in the at least one status indicator is independently associated with a progress level of at least one of the corresponding plurality of networked processors.

3. The method of claim 1, further including:
   adjusting a packet length responsive to a progress level of at least one of the corresponding plurality of networked processors.

4. The method of claim 1, further including:
   adjusting a sample block size responsive to a progress level of at least one of the corresponding plurality of networked processors.

5. The method of claim 1, wherein a third status indicator included in the at least one status indicator independently indicates a status of at least one buffer independently associated with one of the corresponding plurality of networked processors.

6. The method of claim 5, wherein the status is selected from at least one of a buffer fill amount, a buffer fill rate, and a buffer fill acceleration.

7. The method of claim 1, further including:
   synchronously clocking a plurality of routers, including the at least two routers, coupled to the corresponding plurality of networked processors.

8. The method of claim 7, further including:
   adjusting a synchronous clocking speed of the plurality of routers coupled to the corresponding plurality of networked processors.

9. The method of claim 1, further including:
   statically determining at least two different speeds for at least some of the plurality of processor clocks at substantially a time of compilation for a program to be commonly executed by the corresponding plurality of networked processors.

10. An article including a machine-accessible medium storing associated information, wherein the information, when accessed, results in a machine performing:
    independently adjusting a plurality of processor clocks coupled to a corresponding plurality of networked processors responsive to at least one status indicator, wherein at least two status indicators, including the at least one status indicator, independently indicate a status of at least two routers coupled to the corresponding plurality of networked processors; and
    independently adjusting a speed of at least one of the plurality of processor clocks to balance a processor workload measurement imbalance indicated by the at least one status indicator and a second status indicator, wherein the second status indicator is different than the at least two status indicators.

11. The article of claim 10, wherein a third status indicator included in the at least one status indicator independently indicates a status of at least one buffer independently associated with one of the corresponding plurality of networked processors.

12. The article of claim 11, wherein the status is selected from at least one of a sampling rate and a change in the sampling rate.

13. The article of claim 10, wherein the information, when accessed, results in the machine performing:
    independently adjusting a speed of at least one of the plurality of processor clocks to change at least one of a buffer fill amount, a buffer fill rate, and a buffer fill acceleration.

14. The article of claim 10, wherein the information, when accessed, results in the machine performing;
    independently adjusting a speed of at least one of the plurality of processor clocks to compensate for at least one of a forecasted workload and a forecasted network traffic loading.

15. An apparatus, including:
    an adjustment module comprising hardware circuitry to independently adjust a plurality of processor clocks coupled to a corresponding plurality of networked processors responsive to at least one status indicator, and to independently adjust a speed of at least one of the plurality of processor clocks to balance a processor workload measurement imbalance indicated by the at least one status indicator and a second status indicator, wherein at least two status indicators, including the at least one status indicator, independently indicate a status of at least two routers coupled to the corresponding plurality of networked processors, and wherein the second status indicator is different than the at least two status indicators.

16. The apparatus of claim 15, further including:
a host processor included in the adjustment module.

17. The apparatus of claim 15, further including:
the at least one status indicator coupled to at least one of the corresponding plurality of networked processors.

18. The apparatus of claim 15, further including:
two buffers independently coupled to at least two buffer status indicators capable of communicating with the adjustment module, the at least two buffer status indicators to indicate at least one of a buffer fill status, a buffer fill velocity, and a buffer fill acceleration.

19. The apparatus of claim 15, further including:
a plurality of synchronously-clocked routers, including the at least two routers, coupled to the corresponding plurality of networked processors.

20. A system, including:
a plurality of networked processors coupled to a corresponding plurality of independently adjustable clocks having a frequency to be adjusted responsive to at least one stats indicator, wherein a speed of at least one of the plurality of processor clocks is independently adjustable to balance a processor workload measurement imbalance indicated by the at least one status indicator and a second status indicator, and wherein at least two status indicators, including the at least one status indicator, independently indicate a status of at least two routers coupled to the corresponding plurality of networked processors; and
an energy conduit coupled to at least one of the plurality of networked processors, wherein the second status indicator is different than the at least two status indicators.

21. The system of claim 20, wherein a speed for at least some of the plurality of processor clocks is statically determined at substantially a time of compilation for a program to be commonly executed by the corresponding plurality of networked processors, wherein a first processor and a second processor are included in the corresponding plurality of networked processors, and wherein a first determined speed for the first processor is different from a second determined speed for the second processor.

22. The system of claim 20, wherein at least two traffic status indicators capable of communicating with an adjustment module are to indicate a first network traffic loading and a second network traffic loading associated with a network coupled to the plurality of networked processors.

23. The system of claim 20, wherein the energy conduit is selected from one of an omnidirectional antenna and an infrared transceiver.

* * * * *